(12) United States Patent
Eaton et al.

(10) Patent No.: US 6,879,457 B2
(45) Date of Patent: Apr. 12, 2005

(54) TIMING BASED SERVO WITH FIXED DISTANCES BETWEEN TRANSITIONS

(75) Inventors: James Howard Eaton, Morgan Hill, CA (US); Wayne Isami Imaino, San Jose, CA (US); Tzong-Shii Pan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 409 days.

(21) Appl. No.: 10/073,290

(22) Filed: Feb. 13, 2002

(65) Prior Publication Data

US 2003/0151844 A1 Aug. 14, 2003

(51) Int. Cl.$^7$ .......................... G11B 21/02; G11B 5/09
(52) U.S. Cl. ........................................ 360/75; 360/48
(58) Field of Search .................. 360/77.12, 75, 360/48

(56) References Cited

U.S. PATENT DOCUMENTS

| | | | |
|---|---|---|---|
| 5,689,384 A | 11/1997 | Albrecht et al. | 360/77.12 |
| 5,930,065 A | 7/1999 | Albrecht et al. | 360/77.12 |
| 6,021,013 A | 2/2000 | Albrecht et al. | 360/53 |
| 6,118,745 A | 9/2000 | Hutchins et al. | 360/59 |
| 6,282,051 B1 | 8/2001 | Albrecht et al. | 360/75 |
| 6,542,325 B1 * | 4/2003 | Molstad et al. | 360/77.12 |

* cited by examiner

Primary Examiner—Sinh Tran
Assistant Examiner—K. Wong
(74) Attorney, Agent, or Firm—John H. Holcombe

(57) ABSTRACT

A servo writer generates a linear servo track timing based servo pattern comprised of transitions that extend laterally of the track. At least three spaced apart write elements, two of parallel azimuthal orientation, and at least one of a different azimuthal orientation, write patterns corresponding to the write elements, fixing both the distance between transitions having different azimuthal orientation, the "A" distance, and the distance between transitions having parallel azimuthal orientation, the "B" distance. The fixed distances provide precise sensing of lateral position based on a measure of time over the "A" distance compared to time over the "B" distance.

12 Claims, 10 Drawing Sheets

TIMING BASED SERVO WITH FIXED DISTANCES BETWEEN TRANSITIONS

DOCUMENTS INCORPORATED BY REFERENCE

Commonly assigned U.S. Pat. No. 5,689,384, Albrecht et al, is incorporated for its showing of a timing based servo system, including a servo writer.

FIELD OF THE INVENTION

This invention relates to servo systems for laterally positioning data heads with respect to linear data storage media, such as magnetic tape, and, more particularly, to linear servo track timing based servo patterns.

BACKGROUND OF THE INVENTION

Linear data storage media such as magnetic tape provides a means for physically storing data which may be archived or which may be stored in storage shelves of automated data storage libraries and accessed when required. One method for maximizing the amount of data that can be stored is to maximize the number of parallel tracks on the media, and this is typically accomplished by employing servo systems which provide track following and allow the tracks to be spaced very closely.

An example of track following servoing is the provision of prerecorded parallel longitudinal servo tracks that lie between groups of longitudinal data tracks, so that one or more servo heads may read the servo tracks and an accompanying track following servo will adjust the lateral position of the head or the tape to maintain the servo heads at a desired lateral position with respect to the servo tracks such that the data heads are centered with respect to the data tracks.

An example of a track following servo system comprises a timing based servo system of the incorporated U.S. Pat. No. 5,689,384. A timing based servo system is employed, for example, with the Linear Tape Open (LTO) format, one example comprising the IBM LTO Ultrium magnetic tape drive and associated tape cartridge. A linear servo track comprises a sensible transition pattern, for example, of prerecorded magnetic transitions forming a timing based servo pattern of a repeating cyclic periodic sequence of transitions of two different azimuthal orientations that extend laterally over the linear servo track. For example, the pattern may comprise transitions slanted, or having an azimuthal orientation, in a first direction with respect to the direction of the linear servo track, alternating with transitions slanted, or having an azimuthal orientation, in the opposite direction. Thus, as the medium is moved with respect to a servo read head in the linear direction, the lateral positioning of the servo read head with respect to the timing based servo track is sensed based on a measure of time between two transitions having different azimuthal orientation as compared to time between two transitions having parallel azimuthal orientation. The relative timing of the transitions read by the servo read head varies linearly depending on the lateral position of the head. Thus, a number of parallel data tracks may be aligned with different lateral positions across the servo track.

Synchronization of the servo read head and decoder to the servo pattern may be accomplished by having two separate sets of transitions, each set comprising a grouping of a different number of pairs of transitions, one set comprising a grouping having, for example, 4 pairs of transitions, and another set comprising a grouping having 5 pairs of transitions. Thus, the lateral position of a servo read head with respect to the servo track may comprise a measure of time between two transitions having different azimuthal orientation, e.g., between the first transition of a pair in one set and the other transition of the pair, this distance called the "A" distance; as compared to time between two transitions having parallel azimuthal orientation, e.g., between the first transition of a pair in one set and a similar first transition of another pair in another set, called the "B" distance.

The prior linear servo track timing based servo pattern is generated by a servo writer having two spaced apart write elements of different azimuthal orientations, forming the "A" distance. A drive moves the linear data storage medium across the write elements at a predetermined velocity, and a source of timed pulses causes the write elements to write a single pair of transitions for each pulse, such that the pattern of pairs of transitions are written on the linear data storage medium.

In theory, the format is extendable to higher track pitches, wherein the data tracks are closer together. The "A" geometric distance is determined photolithographically, and is independent of the timing of the pulses or of the velocity of the servo writer drive.

However, with the prior servo writer generator utilizing two spaced apart elements with different azimuthal orientations, the writer generator is pulsed periodically with the period between pulses set so that, with the nominal tape velocity of the servo pattern writer, the geometric distance between patterns is the "B" distance mentioned above. Thus any error in the velocity of the tape in the servo writer results in an error in the "B" distance and hence an error in the lateral position calculated based on pulse "B" pulse timing assuming the correct "B" distance. Hence, the precision of the "B" geometric distance between the first transition of a pair in one set and a similar first transition of another pair in another set, is dependent upon the precision of the velocity of the tape in the servo writer drive and the precision of the timing between the pulses, so that the similar first transition of another pair in another set of transitions may be misregistered with respect to the first transition of the pair in the one set. Thus, with a given pulse timing, the distance between transitions determining the "B" distance is strictly proportional to the velocity of the tape in the servo writer. Servo writer velocity error introduces a servo position error to the servo track following system and results in data track misregistration.

Further, the data track misregistration becomes worse for data tracks that are positioned such that the distance between "A" pulses is closer to the distance between "B" pulses.

SUMMARY OF THE INVENTION

It is an object of the present invention to provide a more precise linear servo track timing based servo pattern.

In one embodiment, a servo writer of the present invention generates a linear servo track timing based servo pattern in a linear direction on a linear data storage medium. The timing based servo pattern remains comprised of a repeating cyclic periodic sequence of transitions of two different azimuthal orientations that extend laterally over the linear servo track, such that the timing based servo lateral position is determined based on a measure of time between two transitions having different azimuthal orientation, e.g., the "A" distance, as compared to time between two transitions having parallel azimuthal orientation, e.g., the "B" distance.

With the present invention, the servo writer generator comprises at least three spaced apart write elements, two of parallel azimuthal orientation, and at least one of a different azimuthal orientation than the two of parallel azimuthal orientation. Preferably, the write element of the different azimuthal orientation is located intermediate the two write elements of parallel azimuthal orientation. A drive moves the linear data storage medium in the linear direction across the write elements; and a source of timed pulses causes the spaced apart write elements to simultaneously write.

The write elements write patterns on the linear data storage medium corresponding to the spaced apart write elements, whereby the spaced apart write elements fix both the distance between transitions having different azimuthal orientation, the "A" distance, and the distance between transitions having parallel azimuthal orientation, the "B" distance, with photo lithographic precision independent of the velocity of the tape in the servo writer.

In further embodiments, the invention comprises the method of writing the servo pattern, the sensible transition pattern, and the magnetic tape medium having prerecorded servo information recorded in magnetic transition patterns defining the linear servo track.

In one embodiment, in the repeating cyclic periodic sequence of transitions, the transitions having parallel azimuthal orientation at one end of one pattern continue with the transitions having parallel azimuthal orientation at the opposite end of the next pattern, such that the continuing transitions are combined to have a different number of transitions than the remainder of the repeating cyclic periodic sequence of transitions, thereby providing synchronization of the repeating cyclic periodic sequence of transitions.

In an alternative embodiment, with an even number of the write elements, the source of timed pulses provides a different number of the pulses for alternating sets of pulses provided to the write elements. Thus, the sets of pulses write alternating patterns with different numbers of transitions, thereby providing synchronization of the repeating cyclic periodic sequence of transitions.

In a further alternative embodiment, the source of timed pulses is coupled to two adjacent write elements and separately coupled to the other write elements. The source of timed pulses provides a first set of timed pulses to all of the spaced apart write elements to simultaneously write to fix the distances between both the "A" and "B" transitions, and additionally provides at least one second timed pulse to only two adjacent write elements to write different numbers of transitions within the pattern, thereby providing synchronization of the repeating cyclic periodic sequence of transitions.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Linear data storage media such as magnetic tape provides a means for physically storing data which may be archived or which may be stored in storage shelves of automated data storage libraries and accessed when required. One method for maximizing the amount of data that can be stored is to maximize the number of parallel tracks on the media, and this is typically accomplished by employing servo systems which provide track following and allow the tracks to be spaced very closely.

Figure 1:
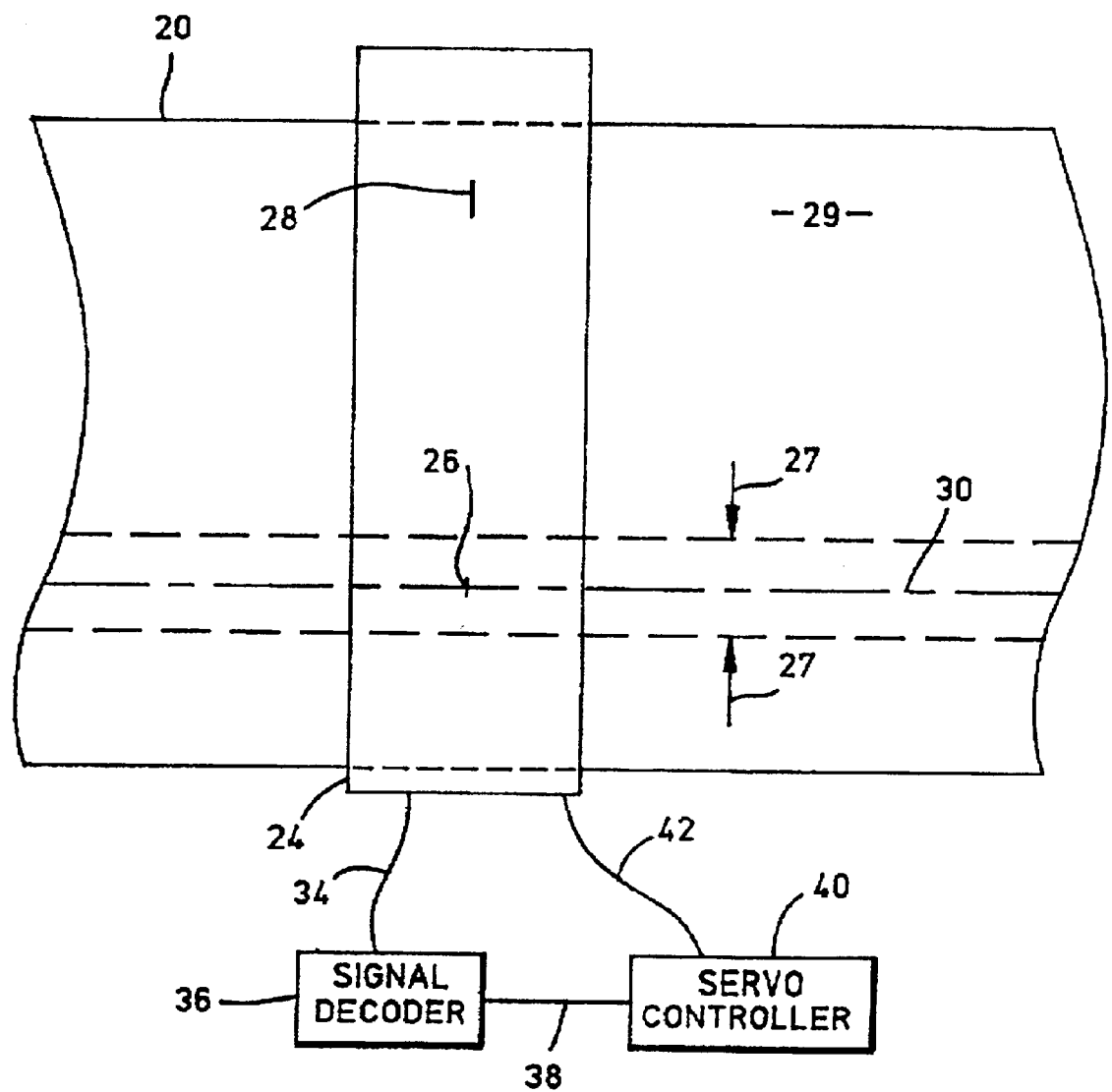
FIG. 1 is a diagrammatic illustration of a magnetic head and servo control system of a magnetic tape drive, and an associated magnetic tape having a servo track which may implement the present invention.

Referring to FIG. 1, an example of track following servoing for linear data storage media such as magnetic tape 20 is the provision of prerecorded parallel longitudinal servo tracks 27 that lie between, or are offset from, groups of longitudinal data tracks 29. A head assembly 24 is shown in solid lines and comprises a relatively narrow servo read head 26 that detects a servo pattern recorded in the relatively wide servo track 27. The head assembly also comprises a data read head 28 positioned over the data track region 29 and offset from the servo read head. Although only a single servo read head and a single data read head are shown, those skilled in the art will appreciate that most tape systems have multiple servo tracks, multiple servo read heads, and multiple data read and/or write heads.

As discussed in the incorporated U.S. Pat. No. 5,689,384, the servo read head 26 has a width that is substantially less than that of the servo track 27 and also that is less than one-half the width of a single data track, which is substantially narrower than a servo track. The servo track centerline 30 is indicated, extending along the length of the tape 20. The servo read head 26 reads the linear servo track timing based servo pattern as the tape 20 is moved linearly with respect to the head, along the length of the servo track 27, and the servo read head generates an analog servo signal that is provided via a servo line 34 to a signal decoder 36. The signal decoder processes the servo read head signal and generates a position signal that is delivered via a position signal line 38 to a servo controller 40. The servo controller generates a servo control signal and provides the signal via a control line 42 to actuate the head assembly 24 to position the servo head 26 laterally, and thereby to position the offset data head 28. The track following servo thereby adjusts the lateral position of the servo head or the tape to maintain the servo head (or heads) at a desired lateral position with respect to the servo track (or tracks) such that the data heads are centered with respect to corresponding data tracks.

Although the linear track following servo system has been described in a tape environment with the servo read head offset from the data head, a linear track following servo may also be implemented in a disk drive environment, for example, with a sector servo system in which the servo tracks are laid out in the same tracks as the data, and are read by the data heads, but the servo portions of the tracks are in sectors distributed around the disk and separating the data. In this case, the servo tracks may each encompass the width of several data tracks, but are prerecorded at data frequencies readable by a data head, as is known to those of skill in the art.

An example of a track following servo system comprises a timing based servo system of the incorporated U.S. Pat. No. 5,689,384. A timing based servo system is employed, for example, with the Linear Tape Open (LTO) format, one example comprising the IBM LTO Ultrium magnetic tape drive and associated tape cartridge.

Figure 2:
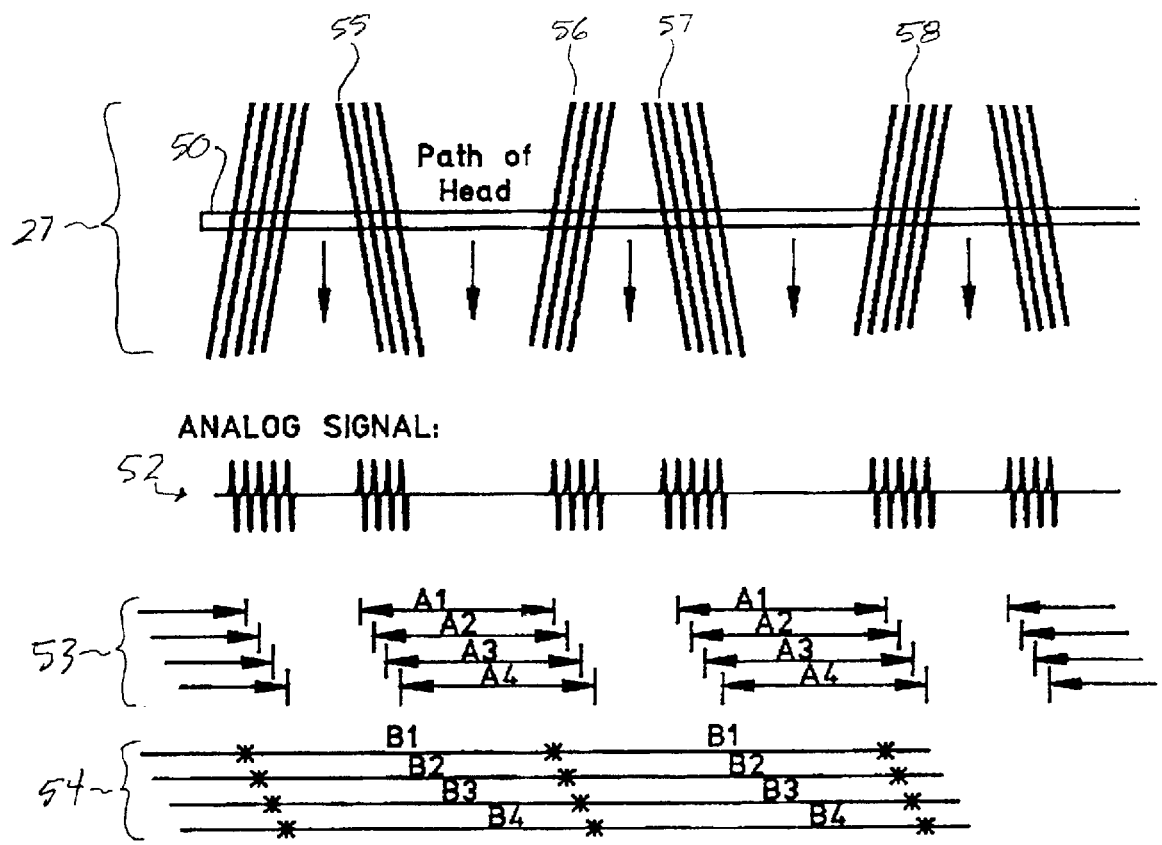
FIG. 2 is a diagrammatic illustration of a servo head of the tape head of FIG. 1 as it tracks a timing based servo pattern, along with a representation of the head output signal and the corresponding A and B signal intervals.

Referring to FIG. 2, a linear servo track 27 comprises a sensible transition pattern, for example, of prerecorded magnetic transitions forming a timing based servo pattern of a repeating cyclic periodic sequence of transitions of two different azimuthal orientations that extend laterally across the linear servo track. Those skilled in the art will recognize the dark vertical stripes represent magnetized areas of recorded magnetic flux that extend across the width of a servo track 27, and that the edges of the stripes comprise flux transitions that are detected to generate the servo read head signal. The transitions have two magnetic polarities, one on each edge of a stripe. When the servo read head crosses a transition of servo track 27, e.g., along path 50, it produces an analog signal pulse 52 whose polarity is determined by the polarity of the transition. For example, the servo read head may produce positive pulses on the leading edge of each stripe (on encountering a stripe), and negative pulses on the trailing edge (on leaving a stripe). To reduce the chance for error, the servo control system times only intervals between magnetic flux transitions having the same polarity. As one example, only transition pulses generated by the servo read head in moving across the leading edge of a stripe are used, and transition pulses generated by moving across the trailing edge of a stripe are ignored. Hence, herein, the term "transition" refers to edges of stripes, or equivalent, that result in the generation of signals having the same polarity.

As discussed above, the pattern may comprise transitions slanted, or having an azimuthal orientation, in a first direction with respect to the direction of the linear servo track, alternating with transitions slanted, or having an azimuthal orientation, in the opposite direction. Thus, as the medium is moved with respect to the servo read head in the linear direction, the lateral positioning of the servo read head with respect to the timing based servo track is sensed based on a measure of time between two transitions having different azimuthal orientation 53, called "A" intervals, as compared to time between two transitions having parallel azimuthal orientation 54, called "B" intervals. The incorporated U.S. Pat. No. 5,689,384 discusses various types of transitions and their orientations.

The relative timing of the transitions read by the servo read head varies linearly depending on the lateral position of the head. Thus, a number of parallel data tracks may be aligned with different lateral positions across the servo track.

Synchronization of the servo read head and decoder to the servo pattern may be accomplished by having two separate sets of transitions, each set comprising a grouping of a different number of pairs of transitions, one set comprising a grouping having, for example, 4 pairs of transitions, and another set comprising a grouping having 5 pairs of transitions. Herein, "synchronization" refers to a determination of the location of a sensed transition within the cyclic periodic sequence of transitions. In FIG. 2, a pair of transitions may comprise transitions 55 and 56 in a grouping of 4 pairs, and may comprise transitions 57 and 58 in a grouping of 5 pairs. Thus, the lateral position of a servo read head with respect to the servo track may comprise a measure of distance between two transitions having different azimuthal orientation, e.g., between a first transition 55 of a pair in one set and the other transition 56 of the pair, this distance called the "A" distance. The servo read head senses transitions in time which must be converted to geometric distance to compute lateral position. The distance between transitions having parallel orientation is independent of lateral position. Parallel transitions are nominally written a fixed distance apart by the servo writer, thus by comparing the "A" timings 53 to the "B" timings 54 the geometric length of the "A" pulse and hence the lateral position can be determined. Note that the lateral position determined in this manner is independent of tape speed in the readback device (as long as it doesn't change during the time the "A" and "B" pulses are measured).

Figure 3:
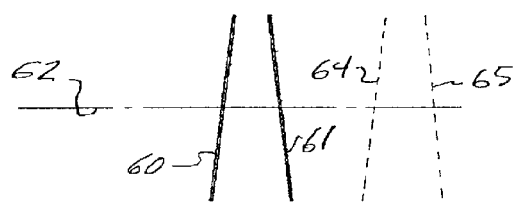
FIG. 3 is a diagrammatic illustration of a prior art arrangement of servo write elements.

Referring to FIG. 3, in the prior art, the linear servo track timing based servo pattern is generated by a servo writer having two spaced apart write elements 60 and 61 of different azimuthal orientations, forming the "A" distance. A drive moves the linear data storage medium across the write elements along a path illustrated by centerline 62 at a predetermined velocity, and a source of timed pulses causes the write elements to write a single pair of transitions for each pulse, such that the pattern of pairs of transitions are written on the linear data storage medium.

In theory, the format is extendable to higher track pitches, wherein the data tracks are closer together. The "A" distance is determined photolithographically, and is independent of the timing of the pulses or of the velocity of the servo writer drive.

However, the geometric "B" distance is dependent upon the precision of the velocity of the servo writer drive and the timed pulses. For example, the write elements 60 and 61 would write the second pair of transitions as illustrated by dashed lines 64 and 65. Thus, the similar first transition 64 of another pair in another set of transitions may be misregistered with respect to the first transition, e.g., formed by write element 60, of the pair in the one set. Hence, with a given pulse timing, the geometric length of the "B" transitions is strictly proportional to the velocity of tape in the drive of the servo writer. Servo writer velocity error introduces a servo position error to the servo track following system and results in data track misregistration.

Figure 4:
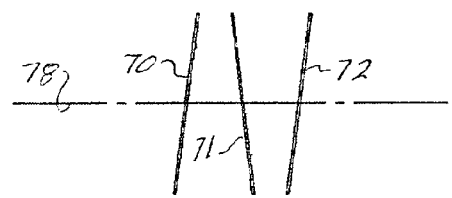
FIG. 4 is a diagrammatic illustration of servo write elements arranged in accordance with one embodiment of the present invention.
Figure 5:
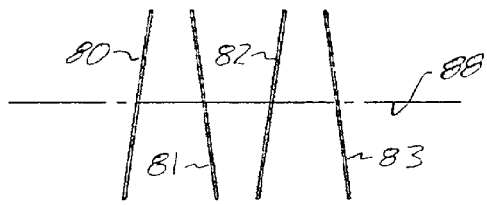
FIG. 5 is a diagrammatic illustration of servo write elements arranged in accordance with an alternative embodiment of the present invention.

Referring to FIGS. 4 and 5, the present invention provides a more precise linear servo track timing based servo pattern, employing a servo writer having at least three spaced apart write elements, two of parallel azimuthal orientation, and at least one of a different azimuthal orientation than the two of parallel azimuthal orientation. Preferably, the write element of the different azimuthal orientation is located intermediate the two write elements of parallel azimuthal orientation.

In the embodiment of FIG. 4, three write elements 70, 71 and 72 are provided, two of the write elements, 70 and 72, of parallel azimuthal orientation, and write element 71 of a different azimuthal orientation than the two of parallel azimuthal orientation, and located intermediate the two write elements of parallel azimuthal orientation.

In the embodiment of FIG. 5, four spaced apart write elements 80–83 are provided. Two write elements 80 and 82 are of parallel azimuthal orientation, and write elements 81 and 83 are of a different azimuthal orientation than the two of parallel azimuthal orientation (and parallel to each other). One of the write elements of the different azimuthal orientation 81 is located intermediate the two write elements of parallel azimuthal orientation. Alternatively, the two write elements 81 and 83 may be considered to be of parallel azimuthal orientation, and write elements 80 and 82 to be of a different azimuthal orientation, with write element 82 located intermediate the two write elements of parallel azimuthal orientation.

Figure 6A:
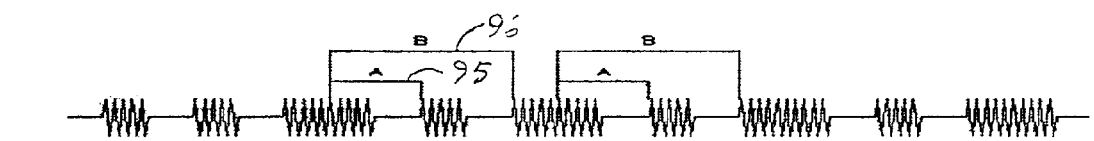
FIGS. 6A and 6B are diagrammatic illustrations, respectively, of a servo pattern written by the servo write elements of FIG. 4, and of a representation of a servo head output signal and the corresponding A and B signal intervals.
Figure 6B:
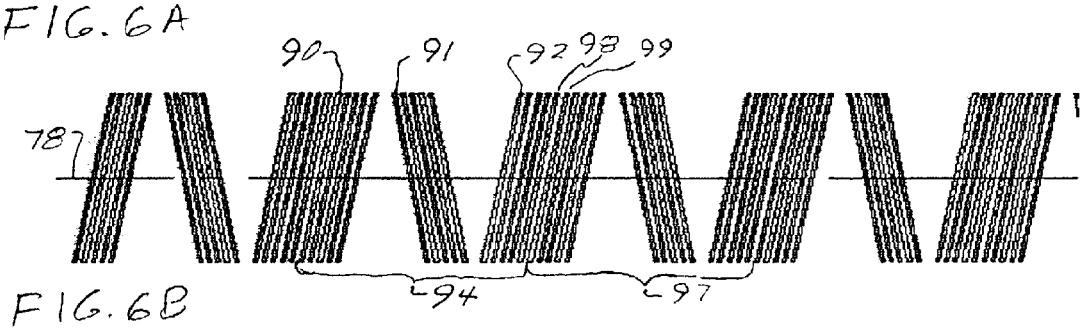

Referring to FIGS. 6A and 6B, linear servo track timing based servo pattern is generated by a servo writer energizing the write elements 70–72 of FIG. 4 as a drive moves the linear data storage medium across the write elements along a path illustrated by centerline 78. A source of timed pulses causes the spaced apart write elements 70–72 to simultaneously write, such that the transitions on the linear data storage medium correspond to the spaced apart write elements. For example, transitions 90, 91 and 92 on the linear data storage medium are written simultaneously and respectively correspond to the spaced apart write elements 70, 71 and 72. A complete pattern of 5 transitions each is represented by bracket 94.

Thus, the spaced apart write elements 70–72 fix both the distance between transitions having different azimuthal orientation, the "A" distance, and the distance between transitions having parallel azimuthal orientation, the "B" distance. Therefore, both the "A" and "B" timing are referenced to the same instant of servo writing, and the position error signal will be independent of servo write tape velocity. For example, simultaneously writing with spaced apart write elements 70 and 71 fixes both transitions 90 and 91 and fixes the "A" distance 95 therebetween. Simultaneously writing with spaced apart write elements 70 and 72 fixes both transitions 90 and 92 and fixes the "B" distance 96 therebetween. Hence, simultaneously writing with the three spaced apart write elements provides a more precise linear servo track timing based servo pattern.

In one embodiment of the present invention, sets of timed pulses are provided to the write elements, each set of pulses writing a pattern of transitions, e.g., pattern 94 of transitions, and spaces the sets of pulses to prevent overwriting of one pattern of transitions by another, e.g., spacing a pattern 97 so as to prevent overwriting transitions of pattern 94.

The illustration of FIG. 6B represents one arrangement of the transitions to provide synchronization of the repeated cyclic periodic sequence of transitions, as "synchronization" is defined above. Specifically, in the repeating cyclic periodic sequence of transitions, the transitions having parallel azimuthal orientation at one end of one pattern, e.g., transition 98 of pattern 94, continue with the transitions having parallel azimuthal orientation at the opposite end of the next pattern, e.g., transition 99 of pattern 97. Thus, the continuing transitions are combined to have a different number of transitions than the remainder of the repeating cyclic periodic sequence of transitions, thereby providing synchronization of the repeating cyclic periodic sequence of transitions.

Figure 7A:
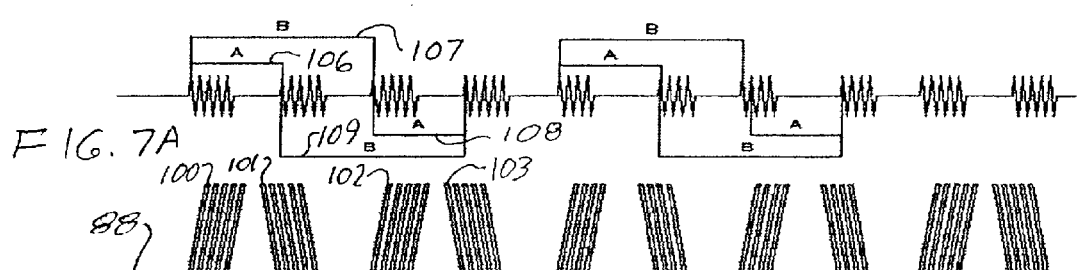
FIGS. 7A and 7B are diagrammatic illustrations, respectively, of a servo pattern written by the servo write elements of FIG. 5, and of a representation of a servo head output signal and the corresponding A and B signal intervals.
Figure 7B:
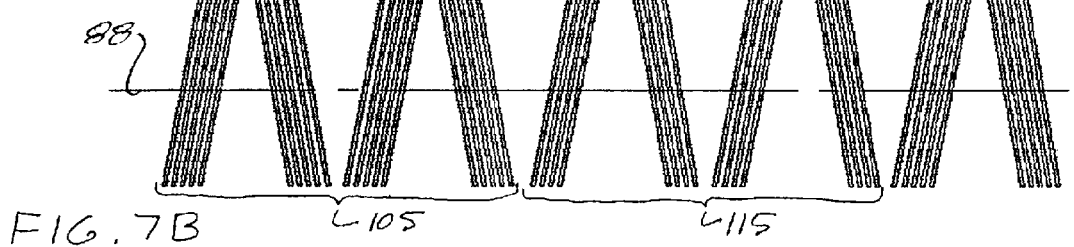

Referring to FIGS. 7A and 7B, linear servo track timing based servo pattern is generated by a servo writer energizing the write elements 80–83 of FIG. 5 as a drive moves the linear data storage medium across the write elements along a path illustrated by centerline 88. A source of timed pulses causes the spaced apart write elements 80–83 to simultaneously write, such that the transitions on the linear data storage medium correspond to the spaced apart write elements and are independent of servo writer velocity. For example, transitions 100, 101, 102 and 103 on the linear data storage medium are written simultaneously and respectively correspond to the spaced apart write elements 80, 81, 82 and 83. A complete pattern of 5 transitions each is represented by bracket 105.

Thus, the spaced apart write elements 80–83 fix both the distance between transitions having different azimuthal orientation, the "A" distance, and the distance between transitions having parallel azimuthal orientation, the "B" distance. For example, simultaneously writing with spaced apart write elements 80 and 81 fixes both transitions 100 and 101 and fixes the "A" distance 106 therebetween. Simultaneously writing with spaced apart write elements 80 and 82 fixes both transitions 100 and 102 and fixes the "B" distance 107 therebetween. Similarly, simultaneously writing with spaced apart write elements 82 and 83 fixes both transitions 102 and 103 and fixes the "A" distance 108 therebetween. Simultaneously writing with spaced apart write elements 81 and 83 fixes both transitions 101 and 103 and fixes the "B" distance 109 therebetween. Hence, simultaneously writing with the four spaced apart write elements provides a more precise linear servo track timing based servo pattern.

An alternative synchronization embodiment is provided with the arrangement of FIGS. 5 and 7B, employing an even number of the write elements 80–83. The source of timed pulses provides a different number of pulses to the write elements 80–83 for each of alternating sets of pulses. Thus, the write elements 80–83 are pulsed to write alternating patterns with different numbers of transitions, thereby providing synchronization of the repeating cyclic periodic sequence of transitions. For example, pattern 105 is written with 5 pulses, writing 5 sets of transitions, and alternating pattern 115 is written with 4 pulses, writing 4 sets of transitions, thereby providing the synchronization.

Figure 8A:
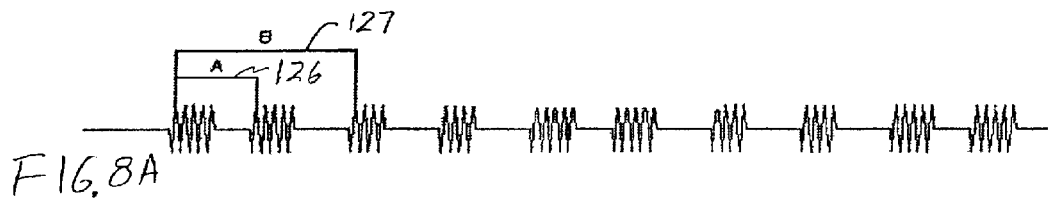
FIGS. 8A and 8B are diagrammatic illustrations, respectively, of a servo pattern written by the servo write elements of FIG. 5, written in separate groups with separate timing, and of a representation of a servo head output signal and the corresponding A and B signal intervals.
Figure 8B:
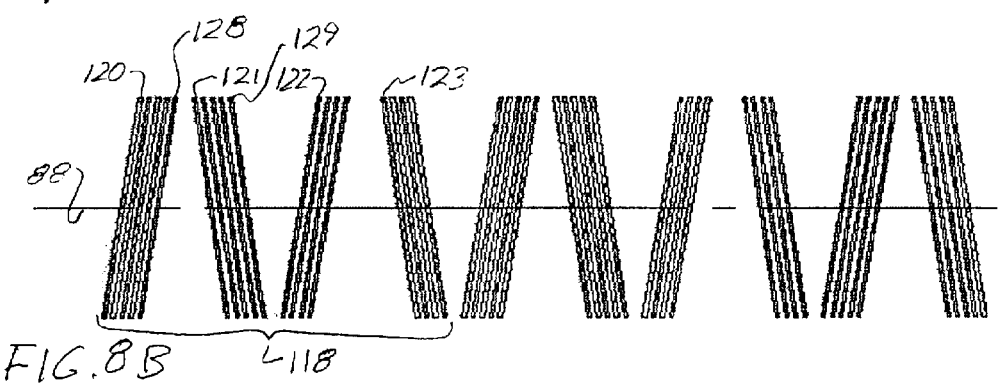

Referring to FIGS. 8A and 8B, a linear servo track timing based servo pattern is generated which duplicates the pattern illustrated in FIG. 2, but with fixed "A" and fixed "B" distances. The servo pattern is produced by a servo writer in which the pulse source is separately coupled to the write elements 80 and 81, and to write elements 82 and 83 of FIG. 5, as will be discussed.

A drive moves the linear data storage medium across the write elements along a path illustrated by centerline 88. As illustrated in FIG. 8B, a source of timed pulses provides pulses to all of the write elements to cause the spaced apart write elements 80–83 to simultaneously write 4 transitions, such that the transitions on the linear data storage medium correspond to the spaced apart write elements. For example, in a pattern of transitions represented by bracket 118, transitions 120, 121, 122 and 123 on the linear data storage medium are written simultaneously and respectively correspond to the spaced apart write elements 80, 81, 82 and 83.

Thus, the spaced apart write elements 80–83 fix both the distance between transitions having different azimuthal orientation, the "A" distance, and the distance between transitions having parallel azimuthal orientation, the "B" distance. For example, simultaneously writing with spaced apart write elements 80 and 81 fixes both transitions 120 and 121 and fixes the "A" distance 126 therebetween. Simultaneously writing with spaced apart write elements 80 and 82 fixes both transitions 120 and 122 and fixes the "B" distance 127 therebetween. The distances may also be fixed as discussed with respect to write elements 82 and 83 for an "A" distance, and write elements 81 and 83 for a "B" distance as discussed above with respect to FIG. 7B. Hence, simultaneously writing with the four spaced apart write elements, or with three of the four write elements, provides a more precise linear servo track timing based servo pattern.

As a further alternative synchronization embodiment, the source of timed pulses is coupled to two adjacent write elements of FIG. 5, and separately coupled to the other write elements. Thus, in the arrangement of FIGS. 5 and 8B, the source of timed pulses is coupled to two adjacent write elements 80 and 81 and separately coupled to the other write elements 82 and 83. The source of timed pulses provides one set of timed pulses to all of the spaced apart write elements 80–83 as discussed above to simultaneously write to fix the distances between the transitions, here called "first" timed pulses, and additionally provides at least one additional timed pulse to only the two adjacent write elements 80 and 81, herein called a "second" timed pulse, to write different numbers of transitions within the pattern for synchronization. For example, one additional timed pulse is provided to write elements 80 and 81 to write transitions 128 and 129, thereby providing a different number of transitions to that portion of the pattern, and providing synchronization of the repeating cyclic periodic sequence of transitions. The one skilled in the art, it will be clear that by separately coupling the pair of write elements 80, 81 and the pair of write elements 82, 83 in FIG. 5, this servo writer head is able to write any pattern that can be written with the prior art servo writer head in FIG. 3, but with the simultaneous pulsing, is ablve to provide the ability to precisely replicate the pattern of 4 transitions built into the servo writer head.

Figure 9:
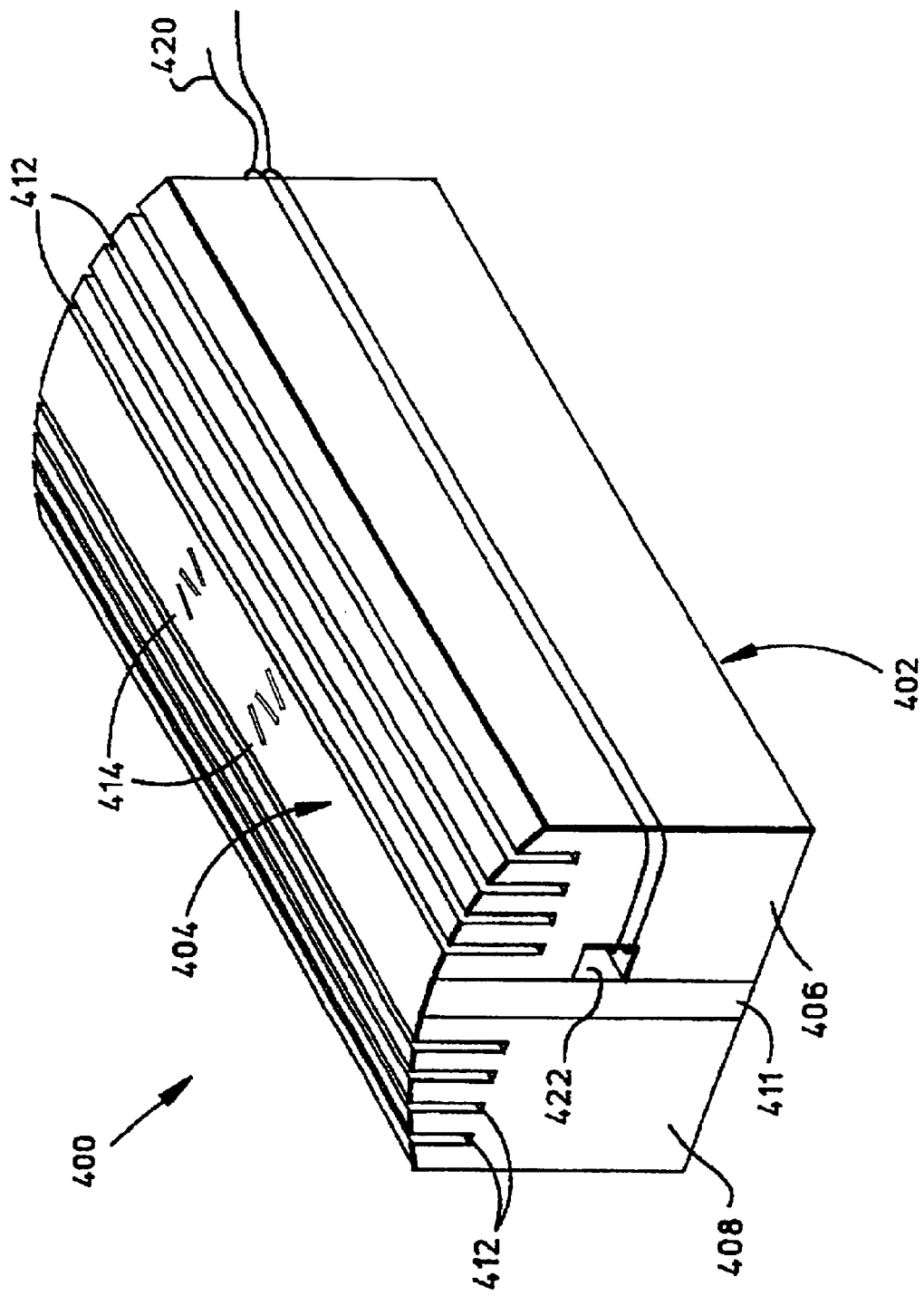
FIG. 9 is an illustration of a magnetic servo write head with servo write elements of FIG. 4.

A multiple gap servo write head 400 is illustrated in FIG. 9, based on the write head of the incorporated U.S. Pat. No. 5,689,384. The illustrated head comprises a ferrite ring 402 with a patterned NiFe (or other suitable magnetic material) pole piece region 404. Two ferrite blocks 406, 408 form the bulk of the write head and are separated by a glass spacer 411. Cross-slots 412 are cut into the head to remove included air when the head is in operation with magnetic tape. The pole piece region 404 is patterned in the shape of the desired servo patterns 414 of write elements by photolithographic techniques as is known to those of skill in the art. A coil 420 is wound around one of the ferrite blocks 408 through a wiring slot 422 to complete the head.

Figure 10:
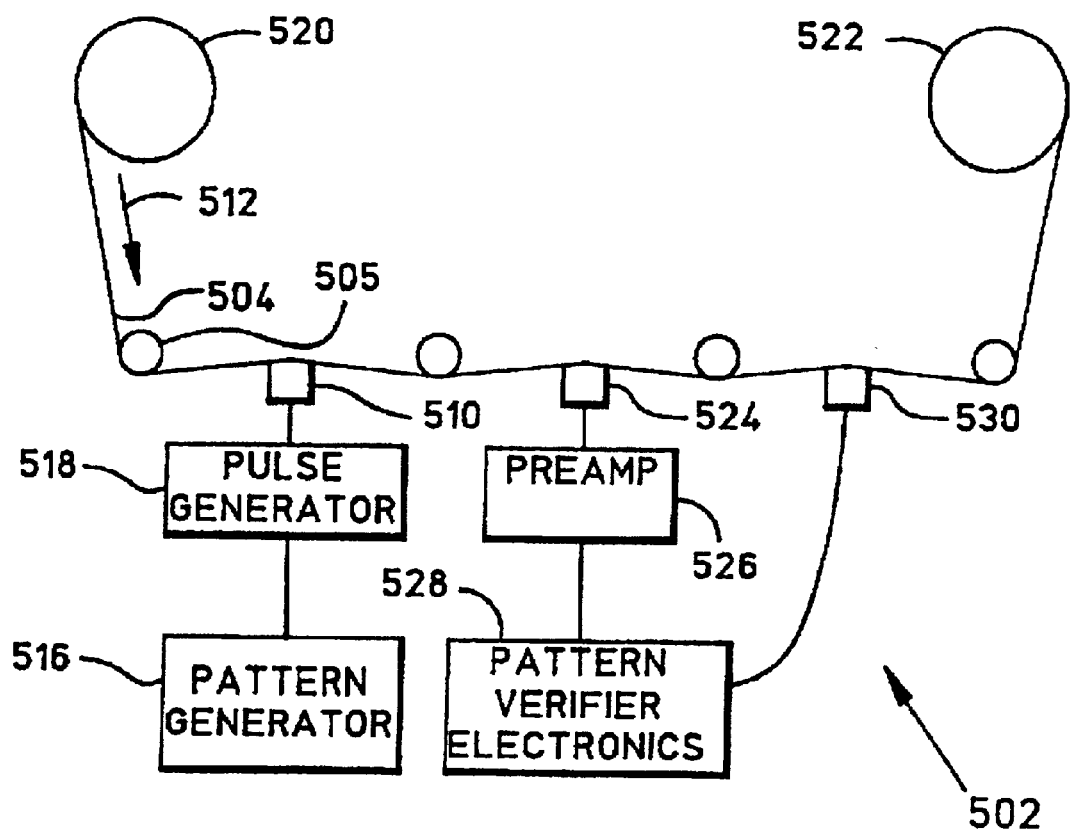
FIG. 10 is a diagrammatic illustration of a servo writer for producing a servo track in accordance with the present invention.
Figure 12:
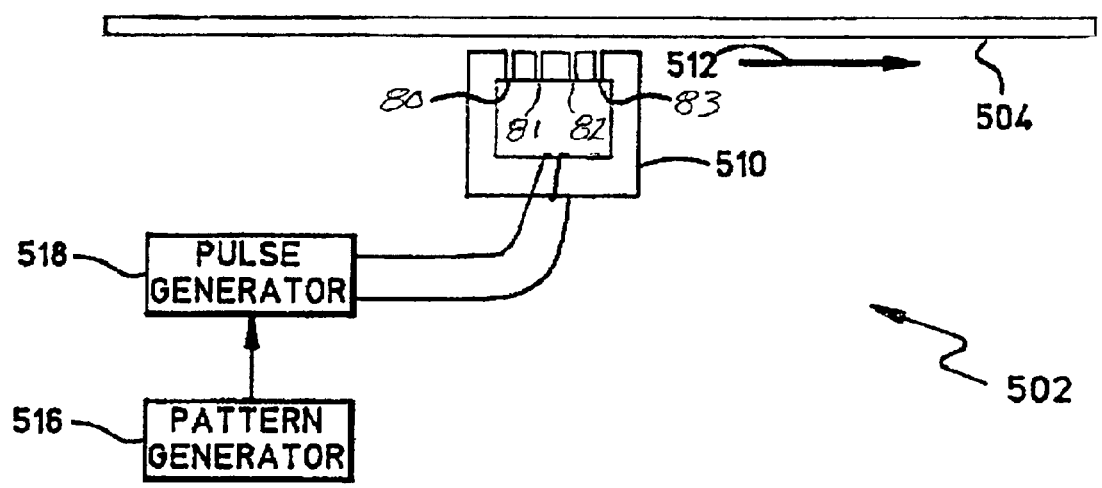
FIG. 12 is a diagrammatic illustration of one embodiment of a servo pattern writer of the servo writer of FIG. 10 employing the servo write elements of FIG. 5 for producing the servo pattern of FIG. 7A.
Figure 13:
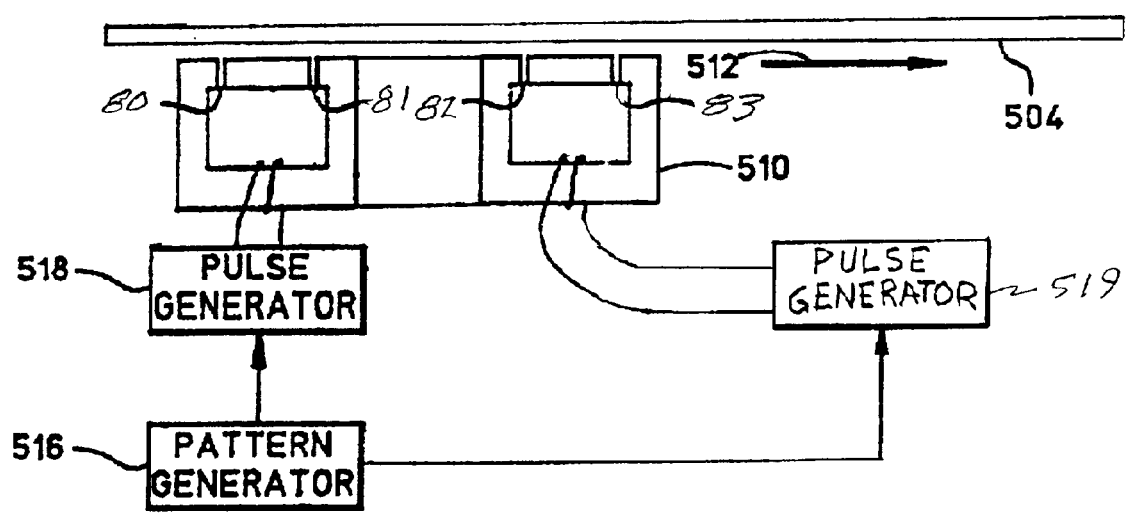
FIG. 13 is a diagrammatic illustration of one embodiment of a servo pattern writer of the servo writer of FIG. 10 employing the servo write elements of FIG. 5 for producing the servo pattern of FIG. 8A.

FIG. 10 illustrates an embodiment of a process of producing a magnetic tape 504 having the servo patterns discussed above using an embodiment of a servo writer 502 in accordance with the present invention. Alternative embodiments of a servo writer 502 are illustrated in FIGS. 11–13.

A drive comprising supply reel 520, take-up reel 522 and rolls 505 move magnetic tape 504 in the direction of arrow 512 across a write head 510 having the patterned write elements. The write head is such as that comprising head 400 illustrated in FIG. 9, with the write elements of FIG. 4 or of FIG. 5. As the tape 504 is moved across the servo write head 510, pulses are provided to the write elements as discussed in the incorporated U.S. Pat. No. 5,689,384 to energize the write elements and record the servo pattern on the tape. The pattern generator 516 provides the pattern pulses to a pulse generator 518 which energizes the head in accordance with the pattern pulses. A servo read head 524 reads the recorded servo pattern and provides a servo signal to a preamplifier 526 for providing an amplified version of the servo signal to a pattern verifier 528 for verifying the servo pattern. If any errors are found that make the servo pattern of unacceptable quality, the verifier operates a bad-tape marking head to place a magnetic mark on the tape 504 so that bad sections of tape are not loaded into a tape cartridge.

Figure 11:
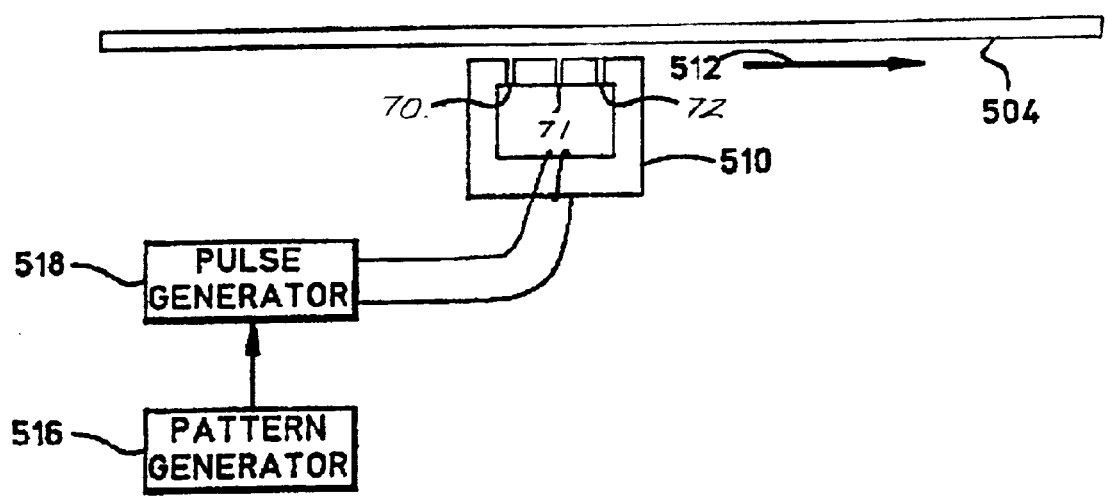
FIG. 11 is a diagrammatic illustration of one embodiment of a servo pattern writer of the servo writer of FIG. 10 employing the servo write elements of FIG. 4 for producing the servo pattern of FIG. 6A.

FIG. 11 illustrates an embodiment of the servo writer employing the write elements 70–72 of FIG. 4 in the write head 510. Pattern generator 516 operates pulse generator 518 to provide pulses causing the spaced apart write elements 70–72 to simultaneously write, such that the transitions, e.g., transitions 90, 91 and 92 of FIG. 6B, are written simultaneously, and, with additional simultaneously written transitions, form a complete pattern of 5 transitions each, as is represented by bracket 94.

Thus, the spaced apart write elements 70–72 fix both the distance between transitions having different azimuthal orientation, the "A" distance 95, and the distance between transitions having parallel azimuthal orientation, the "B" distance 96.

As discussed above, the pulses are sets of timed pulses provided to the write elements, each set of pulses writing a pattern of transitions, e.g., pattern 94 of transitions, and spaced to prevent overwriting of one pattern of transitions by another, e.g., spacing a pattern 97 so as to prevent overwriting transitions of pattern 94.

The timing of the pulses provided by the pattern generator 516 and pulse generator 518 additionally provide synchronization, as described above. Specifically, in FIG. 6B, the transitions having parallel azimuthal orientation at one end of one pattern, e.g., transition 98 of pattern 94, continue with the transitions having parallel azimuthal orientation at the opposite end of the next pattern, e.g., transition 99 of pattern 97. Thus, the continuing transitions are combined to have a different number of transitions than the remainder of the repeating cyclic periodic sequence of transitions, thereby providing synchronization of the repeating cyclic periodic sequence of transitions.

FIG. 12 illustrates an embodiment of the servo writer employing the write elements 80–83 of FIG. 5 in the write head 510. Pattern generator 516 operates pulse generator 518 to provide pulses causing the spaced apart write elements 80–83 to simultaneously write, such that the transitions, e.g., transitions 100, 101, 102 and 103 of FIG. 7B, are written simultaneously, and, with additional simultaneously written transitions, form a complete pattern of 5 transitions each is represented by bracket 105.

Thus, the spaced apart write elements 80–83 fix both the distance between transitions having different azimuthal orientation, the "A" distance 106, 108, and the distance between transitions having parallel azimuthal orientation, the "B" distance 107, 109. Hence, simultaneously writing with the four spaced apart write elements provides a more precise linear servo track timing based servo pattern.

Referring to FIGS. 12, 5 and 7B, synchronization is provided by pattern generator 516 and pulse generator 518 providing a different number of pulses to the write elements 80–83 for each of alternating sets of pulses. Thus, the write elements 80–83 are pulsed to write alternating patterns with different numbers of transitions, thereby providing synchronization of the repeating cyclic periodic sequence of transitions. For example, pattern 105 is written with 5 pulses, writing 5 sets of transitions, and alternating pattern 115 is written with 4 pulses, writing 4 sets of transitions, thereby providing the synchronization. Further, as discussed above, the timing of the pulses is such as to space sets of transitions to prevent overwriting.

FIG. 13 illustrates an embodiment of the servo writer employing the write elements 80–83 of FIG. 5 in the write head 510, in which the pattern generator 516 is separately coupled to pulse generator 518 and to pulse generator 519. Thus, the source of pulses is separately coupled to the write elements 80 and 81, and to write elements 82 and 83. The write head 510 is a single fixed head with two areas in which write elements are located and which are separately engerized, as is understood by those of skill in the art.

Additionally referring to FIG. 8B, as a drive moves the magnetic tape 504 across the write elements, the source of timed pulses provides pulses to all of the write elements to cause the spaced apart write elements 80–83 to simultaneously write 4 transitions, such that the transitions on the linear data storage medium correspond to the spaced apart write elements. For example, in the pattern of transitions represented by bracket 118, transitions 120, 121, 122 and 123 are written simultaneously and respectively correspond to the spaced apart write elements 80, 81, 82 and 83. Thus, the spaced apart write elements 80–83 fix both the distance between transitions having different azimuthal orientation, the "A" distance 126, and the distance between transitions having parallel azimuthal orientation, the "B" distance 127.

Coupling the source of timed pulses to two adjacent write elements 80 and 81 of FIG. 5, and separately coupling the other write elements 82 and 83 allows the pattern to be synchronized and appear similar to the pattern of FIG. 2. As discussed above, pattern generator 516 and pulse generators 518 and 519 provide first timed pulses to all of the spaced apart write elements 80–83 as discussed above, to simultaneously write the transitions to fix the distances between the transitions. To provide synchronization, pattern generator 518 operates only pulse generator 518 to provide at least one second timed pulse to only the two adjacent write elements 80 and 81 to write different numbers of the transitions within the pattern. Thus, additional transitions are written by less than all of the write elements. This adds transitions to a portion of the pattern that are fewer in number than the simultaneously written transitions. For example, one second timed pulse is provided to write elements 80 and 81 to write transitions 128 and 129, thereby providing a different number of transitions to that portion of the pattern, and providing synchronization of the repeating cyclic periodic sequence of transitions. Again, as discussed above, the timing of the pulses is such as to space sets of transitions to prevent overwriting.

Those of skill in the art understand that alternative arrangements of the pattern generator and pulse generator(s) and alternative timings of the timed pulses may be employed with alternative arrangements of the write elements to produce patterns of transitions which also fix the "A" distances and the "B" distances.

Figure 14:
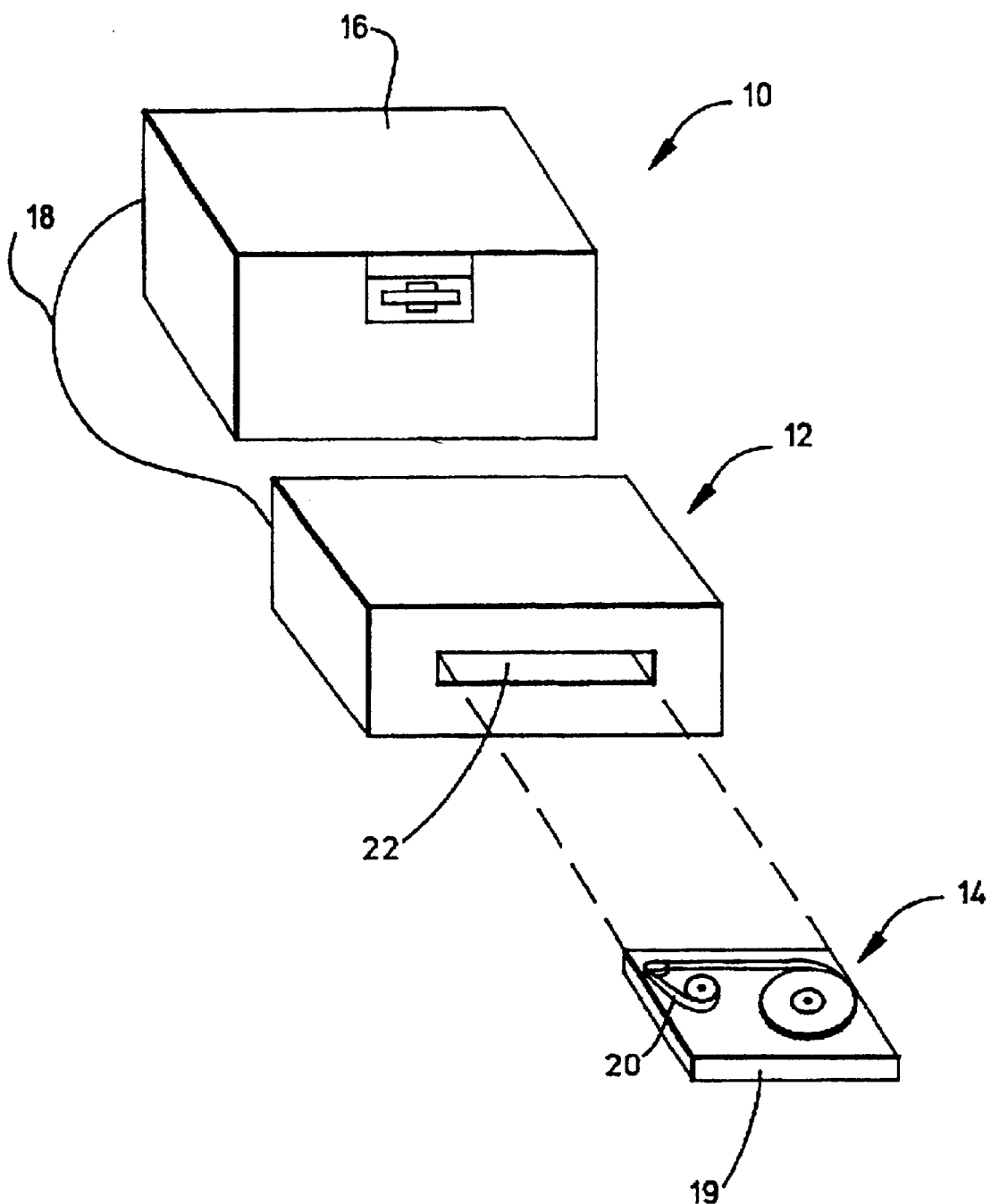
FIG. 14 is a diagrammatic illustration of a tape drive storage device and an associated tape cartridge which may implement a servo track of the present invention.

FIG. 14 illustrates an example of a tape drive system 10 employing track following servoing which may be employed with a tape having a linear servo track timing based servo pattern of the present invention. The tape drive 12 accepts a tape cartridge 14 and is coupled to a host system 16 by a coupling 18. The tape cartridge comprises a housing 19 containing a length of magnetic tape 20. The tape drive 12 is arranged for use with a length of magnetic tape having a linear servo track timing based servo pattern. The tape drive reads the servo information as the servo read head traces a path along the servo pattern, and generates a position signal to control the position of a data head, such as is discussed with respect to FIG. 1.

In the servo pattern, the "A" distances and the "B" distances are fixed in accordance with the present invention, thereby providing a more precise linear servo track timing based servo pattern.

While the preferred embodiments of the present invention have been illustrated in detail, it should be apparent that modifications and adaptations to those embodiments may occur to one skilled in the art without departing from the scope of the present invention as set forth in the following claims.

We claim:

1. A servo writer for generating a linear servo track timing based servo pattern in a linear direction on a linear data storage medium, said timing based servo pattern comprised of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, said servo writer comprising:

at least three spaced apart write elements, two said write elements of parallel azimuthal orientation, and at least one said write element of a different azimuthal orientation than said two write elements of parallel azimuthal orientation;

a drive for moving said linear data storage medium in said linear direction across said write elements; and a source of timed pulses coupled to said write elements and providing timed pulses to cause said spaced apart write elements to simultaneously write, thereby writing patterns of transitions on said linear data storage medium corresponding to said spaced apart write elements as said drive moves said linear data storage medium across said write elements, whereby said spaced apart write elements fix a distance between said simultaneously written transitions having different azimuthal orientation and fix a distance between said simultaneously written transitions having parallel azimuthal orientation, wherein said source of timed pulses provides sets of pulses to said write elements, each said set of pulses writing a pattern of said transitions, and spaces said sets of pulses to prevent overwriting of one said pattern of transitions by another;

wherein at least one said write element of said different azimuthal orientation is located intermediate said two write elements of parallel azimuthal orientation; and wherein said source of timed pulses additionally spaces said sets of pulses such that, in said repeating cyclic periodic sequence of transitions, said transitions having parallel azimuthal orientation at one end of one pattern continue with said transitions having parallel azimuthal orientation at the opposite end of the next pattern, such that said continuing transitions having parallel azimuthal orientation of said one pattern and said next pattern are combined to have a different number of transitions than the remainder of said repeating cyclic periodic sequence of transitions, thereby providing synchronization of said repeating cyclic periodic sequence of transitions.

2. A servo writer for generating a linear servo track timing based servo pattern in a linear direction on a linear data storage medium, said timing based servo pattern comprised of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, said servo writer comprising:

at least three spaced apart write elements, two said write elements of parallel azimuthal orientation, and at least one said write element of a different azimuthal orientation than said two write elements of parallel azimuthal orientation;

a drive for moving said linear data storage medium in said linear direction across said write elements; and a source of timed pulses coupled to said write elements and providing timed pulses to cause said spaced apart write elements to simultaneously write, thereby writing patterns of transitions on said linear data storage medium corresponding to said spaced apart write elements as said drive moves said linear data storage medium across said write elements, whereby said spaced apart write elements fix a distance between said simultaneously written transitions having different azimuthal orientation and fix a distance between said simultaneously written transitions having parallel azimuthal orientation, wherein said source of timed pulses provides sets of pulses to said write elements, each said set of pulses writing a pattern of said transitions, and spaces said sets of pulses to prevent overwriting of one said pattern of transitions by another;

comprising an even number of said write elements, and wherein said source of timed pulses provides a different number of said pulses for alternating said sets of pulses provided to said write elements, whereby said sets of pulses write alternating said patterns with different numbers of said transitions, thereby providing synchronization of said repeating cyclic periodic sequence of transitions.

3. A servo writer for generating a linear servo track timing based servo pattern in a linear direction on a linear data storage medium, said timing based servo pattern comprised of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, said servo writer comprising:

at least three spaced apart write elements, two said write elements of parallel azimuthal orientation, and at least one said write element of a different azimuthal orientation than said two write elements of parallel azimuthal orientation;

a drive for moving said linear data storage medium in said linear direction across said write elements; and a source of timed pulses coupled to said write elements and providing timed pulses to cause said spaced apart write elements to simultaneously write, thereby writing patterns of transitions on said linear data storage medium corresponding to said spaced apart write elements as said drive moves said linear data storage medium across said write elements, whereby said spaced apart write elements fix a distance between said simultaneously written transitions having different azimuthal orientation and fix a distance between said simultaneously written transitions having parallel azimuthal orientation, wherein said source of timed pulses provides sets of pulses to said write elements, each said set of pulses writing a pattern of said transitions, and spaces said sets of pulses to prevent overwriting of one said pattern of transitions by another;

wherein said source of timed pulses is coupled to at least two adjacent said write elements and separately coupled to other said write elements, said source of timed pulses providing first timed pulses to all of said spaced apart write elements to simultaneously write to fix said distances between said transitions, and additionally providing at least one second timed pulse to less than all and at least said two adjacent write elements to provide a different number of said pulses for said at least two adjacent write elements to thereby write different numbers of said transitions within said pattern, thereby providing synchronization of said repeating cyclic periodic sequence of transitions.

4. A method for generating a linear servo track timing based servo pattern in a linear direction on a linear data storage medium, said timing based servo pattern comprised of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, comprising the steps of:

providing at least three spaced apart write elements, two said write elements of parallel azimuthal orientation, and at least one said write element of a different azimuthal orientation than said two write elements of parallel azimuthal orientation;

moving said linear data storage medium in said linear direction across said write elements; and providing timed pulses to cause said spaced apart write elements to simultaneously write, thereby writing patterns of transitions on said linear data storage medium corresponding to said spaced apart write elements as said linear data storage medium is moved across said write elements, whereby said spaced apart write elements fix a distance between said simultaneously written transitions having different azimuthal orientation and fix a distance between said simultaneously written transitions having parallel azimuthal orientation, wherein said step of providing timed pulses comprises providing sets of pulses to said write elements, each said set of pulses writing a pattern of said transitions, and spaces said sets of pulses to prevent overwriting of one said pattern of transitions by another;

wherein said step of providing at least three spaced apart write elements, additionally comprises locating at least one said write element of said different azimuthal orientation intermediate said two write elements of parallel azimuthal orientation; and wherein said step of providing timed pulses additionally comprises spacing said sets of pulses such that in said repeating cyclic periodic sequence of transitions, said transitions having parallel azimuthal orientation at one end of one pattern continue with said transitions having parallel azimuthal orientation at the opposite end of the next pattern, such that said continuing transitions having parallel azimuthal orientation of said one pattern and said next pattern are combined to have a different number of transitions than the remainder of said repeating cyclic periodic sequence of transitions, thereby providing synchronization of said repeating cyclic periodic sequence of transitions.

5. A method for generating a linear servo track timing based servo pattern in a linear direction on a linear data storage medium, said timing based servo pattern comprised of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, comprising the steps of:

providing at least three spaced apart write elements, two said write elements of parallel azimuthal orientations and at least one said write element of a different azimuthal orientation than said two write elements of parallel azimuthal orientation;

moving said linear data storage medium in said linear direction across said write elements; and providing timed pulses to cause said spaced apart write elements to simultaneously write, thereby writing patterns of transitions on said linear data storage medium corresponding to said spaced apart write elements as said linear data storage medium is moved across said write elements, whereby said spaced apart write elements fix a distance between said simultaneously written transitions having different azimuthal orientation and fix a distance between said simultaneously written transitions having parallel azimuthal orientation, wherein said step of providing timed pulses comprises providing sets of pulses to said write elements, each said set of pulses writing a pattern of said transitions, and spaces said sets of pulses to prevent overwriting of one said pattern of transitions by another;

wherein said step of providing at least three spaced apart write elements comprises providing an even number of said write elements, and wherein said step of providing timed pulses comprises providing a different number of said pulses for alternating said sets of pulses provided to said write elements, whereby said sets of pulses write alternating said patterns with different numbers of said transitions, thereby providing synchronization of said repeating cyclic periodic sequence of transitions.

6. A method for generating a linear servo track timing based servo pattern in a linear direction on a linear data storage medium, said timing based servo pattern comprised of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, comprising the steps of:

providing at least three spaced apart write elements, two said write elements of parallel azimuthal orientation, and at least one said write element of a different azimuthal orientation than said two write elements of parallel azimuthal orientation;

moving said linear data storage medium in said linear direction across said write elements; and providing timed pulses to cause said spaced apart write elements to simultaneously write, thereby writing patterns of transitions on said linear data storage medium corresponding to said spaced apart write elements as said linear data storage medium is moved across said write elements, whereby said spaced apart write elements fix a distance between said simultaneously written transitions having different azimuthal orientation and fix a distance between said simultaneously written transitions having parallel azimuthal orientation, wherein said step of providing timed pulses comprises providing sets of pulses to said write elements, each said set of pulses writing a pattern of said transitions and spaces said sets of pulses to prevent overwriting of one said pattern of transitions by another;

wherein said step of providing timed pulses comprises providing first timed pulses to all of said spaced apart write elements to simultaneously write to fix said distances between said transitions, and additionally providing at least one second timed pulse to less than all and at least two adjacent said write elements to provide a different number of said pulses for said at least two adjacent write elements to thereby write different numbers of said transitions within said pattern, thereby providing synchronization of said repeating cyclic periodic sequence of transitions.

7. A sensible transition pattern for recording servo information in a linear direction on a linear data storage medium defining at least one linear servo track, said sensible transition pattern comprised of a timing based servo pattern of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, comprising:

a repeating pattern of at least three spaced apart said transitions of said two different azimuthal orientations that extend laterally of said linear servo track, two of said transitions of parallel azimuthal orientation, and at least one of said transitions of a different azimuthal orientation than said two transitions of parallel azimuthal orientation; said at least three spaced apart said transitions simultaneously written to fix a distance between said simultaneously written transitions having different azimuthal orientation and to fix a distance between said simultaneously written transitions having parallel azimuthal orientation, thereby defining said distance between transitions having different azimuthal orientation and said distance between transitions having parallel azimuthal orientation, wherein said transitions are arranged in sets of transitions, forming said repeating pattern, said sets of transitions spaced to prevent overwritten transitions of one said repeating pattern by another;

wherein said repeating pattern of at least three spaced apart said transitions comprises at least one said transition of said different azimuthal orientation located intermediate said two transitions of parallel azimuthal orientation; and wherein said sets of transitions are additionally spaced such that in said repeating cyclic periodic sequence of transitions, said transitions having parallel azimuthal orientation at one end of one said repeating pattern continue with said transitions having parallel azimuthal orientation at the opposite end of the next said repeating pattern, such that said continuing transitions having parallel azimuthal orientation of said one repeating pattern and said next repeating pattern are combined to have a different number of transitions than the remainder of said repeating cyclic periodic sequence of transitions, thereby providing synchronization of said repeating cyclic periodic sequence of transitions.

8. A sensible transition pattern for recording servo information in a linear direction on a linear data storage medium defining at least one linear servo track, said sensible transition pattern comprised of a timing based servo pattern of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, comprising:

a repeating pattern of at least three spaced apart said transitions of said two different azimuthal orientations that extend laterally of said linear servo track, two of said transitions of parallel azimuthal orientations, and at least one of said transitions of a different azimuthal orientation than said two transitions of parallel azimuthal orientation; said at least three spaced apart said transitions simultaneously written to fix a distance between said simultaneously written transitions having different azimuthal orientation and to fix a distance between said simultaneously written transitions having parallel azimuthal orientation, thereby defining said distance between transitions having different azimuthal orientation and said distance between transitions having parallel azimuthal orientation, wherein said transitions are arranged in sets of transitions, forming said repeating pattern, said sets of transitions spaced to prevent overwritten transitions of one said repeating pattern by another;

wherein said repeating pattern of at least three spaced apart said transitions comprises an even number of said transitions, and wherein alternating said sets of said transitions of said repeating patterns comprise different numbers of said transitions, thereby providing synchronization of said repeating cyclic periodic sequence of transitions.

9. A sensible transition pattern for recording servo information in a linear direction on a linear data storage medium defining at least one linear servo track, said sensible transition pattern comprised of a timing based servo pattern of a repeating cyclic periodic sequence of transitions of two different azimuthal orientations that extend laterally of said linear servo track, said timing based servo track sensed during movement of said linear data storage medium in said linear direction by determining lateral positioning with respect to said linear servo track based on a measure of time between two said transitions having different azimuthal orientation as compared to time between two said transitions having parallel azimuthal orientation, comprising:

a repeating pattern of at least three spaced apart said transitions of said two different azimuthal orientations that extend laterally of said linear servo track, two of said transitions of parallel azimuthal orientation, and at least one of said transitions of a different azimuthal orientation than said two transitions of parallel azimuthal orientation; said at least three spaced apart said transitions simultaneously written to fix a distance between said simultaneously written transitions having different azimuthal orientation and to fix a distance between said simultaneously written transitions having parallel azimuthal orientation, thereby defining said distance between transitions having different azimuthal orientation and said distance between transitions having parallel azimuthal orientation, wherein said transitions are arranged in sets of transitions, forming said repeating pattern, said sets of transitions spaced to prevent overwritten transitions of one said repeating pattern by another;

wherein said at least three spaced apart simultaneously written transitions, written to fix said distance between transitions having different azimuthal orientation and to fix said distance between transitions having parallel azimuthal orientation, are accompanied by additional separately written second spaced apart transitions fewer in number than said at least three simultaneously written transitions, written to provide different numbers of said transitions within said pattern, thereby providing synchronization of said repeating cyclic periodic sequence of transitions.

10. A magnetic tape medium having prerecorded servo information recorded in a linear direction in magnetic transition patterns defining at least one linear servo track, said magnetic transition pattern comprised of a timing based servo pattern of a repeating cyclic periodic sequence of magnetic transitions of two different azimuthal orientations that extend laterally of said linear servo track, said timing based servo track sensed during movement of said magnetic tare medium in said linear direction by determining lateral positioning with respect to said linear servo track based on a measure of time between two said magnetic transitions having different azimuthal orientation as compared to time between two said magnetic transitions having parallel azimuthal orientation, comprising:

a repeating pattern of at least three spaced apart said magnetic transitions of said two different azimuthal orientations that extend laterally of said linear servo track, two of said magnetic transitions of parallel azimuthal orientation, and at least one of said magnetic transitions of a different azimuthal orientation than said two magnetic transitions of parallel azimuthal orientation; said at least three spaced apart said magnetic transitions simultaneously written to fix a distance between said simultaneously written magnetic transitions having different azimuthal orientation and to fix a distance between said simultaneously written magnetic transitions having parallel azimuthal orientation, thereby defining said distance between magnetic transitions having different azimuthal orientation and said distance between magnetic transitions having parallel azimuthal orientation, wherein said magnetic transitions are arranged in sets of magnetic transitions, forming said repeating pattern, said sets of magnetic transitions spaced to prevent overwritten magnetic transitions of one said repeating pattern by another;

wherein said repeating pattern of at least three spaced apart said magnetic transitions comprises at least one said magnetic transition of said different azimuthal orientation located intermediate said two magnetic transitions of parallel azimuthal orientation; and wherein said sets of magnetic transitions are additionally spaced such that in said repeating cyclic periodic sequence of magnetic transitions, said magnetic transitions having parallel azimuthal orientation at one end of one said repeating pattern continue with said magnetic transitions having parallel azimuthal orientation at the opposite end of the next said repeating pattern, such that said continuing magnetic transitions having parallel azimuthal orientation of said one repeating pattern and said next repeating pattern are combined to have a different number of magnetic transitions than the remainder of said repeating cyclic periodic sequence of magnetic transitions, thereby providing synchronization of said repeating cyclic periodic sequence of magnetic transitions.

11. A magnetic tape medium having prerecorded servo information recorded in a linear direction in magnetic transition patterns defining at least one linear servo track, said magnetic transition pattern comprised of a timing based servo pattern of a repeating cyclic periodic sequence of magnetic transitions of two different azimuthal orientations that extend laterally of said linear servo track, said timing based servo track sensed during movement of said magnetic tape medium in said linear direction by determining lateral positioning with respect to said linear servo track based on a measure of time between two said magnetic transitions having different azimuthal orientation as compared to time between two said magnetic transitions having parallel azimuthal orientation, comprising:

a repeating pattern of at least three spaced apart said magnetic transitions of said two different azimuthal orientations that extend laterally of said linear servo track, two of said magnetic transitions of parallel azimuthal orientation, arid at least one of said magnetic transitions of a different azimuthal orientation than said two magnetic transitions of parallel azimuthal orientation; said at least three spaced apart said magnetic transitions simultaneously written to fix a distance between said simultaneously written magnetic transitions having different azimuthal orientation and to fix a distance between said simultaneously written magnetic transitions having parallel azimuthal orientation, thereby defining said distance between magnetic transitions having different azimuthal orientation and said distance between magnetic transitions having parallel azimuthal orientation, wherein said magnetic transitions are arranged in sets of magnetic transitions, forming said repeating pattern, said sets of magnetic transitions spaced to prevent overwritten magnetic transitions of one said repeating pattern by another;

wherein said repeating pattern of at least three spaced apart said magnetic transitions comprises an even number of said magnetic transitions, and wherein alternating said sets of said magnetic transitions of said repeating patterns comprise different numbers of said magnetic transitions, thereby providing synchronization of said repeating cyclic periodic sequence of magnetic transitions.

12. A magnetic tape medium having prerecorded servo information recorded in a linear direction in magnetic transition patterns defining at least one linear servo track, said magnetic transition pattern comprised of a timing based servo pattern of a repeating cyclic periodic sequence of magnetic transitions of two different azimuthal orientations that extend laterally of said linear servo track, said timing based servo track sensed during movement of said magnetic tape medium in said linear direction by determining lateral positioning with respect to said linear servo track based on a measure of time between two said magnetic transitions having different azimuthal orientation as compared to time between two said magnetic transitions having parallel azimuthal orientation, comprising:

a repeating pattern of at least three spaced apart said magnetic transitions of said two different azimuthal orientations that extend laterally of said linear servo track, two of said magnetic transitions of parallel azimuthal orientation, and at least one of said magnetic transitions of a different azimuthal orientation than said two magnetic transitions of parallel azimuthal orientation; said at least three spaced apart said magnetic transitions simultaneously written to fix a distance between said simultaneously written magnetic transitions having different azimuthal orientation and to fix a distance between said simultaneously written magnetic transitions having parallel azimuthal orientation, thereby defining said distance between magnetic transitions having different azimuthal orientation and said distance between magnetic transitions having parallel azimuthal orientation, wherein said magnetic transitions are arranged in sets of magnetic transitions, forming said repeating pattern, said sets of magnetic transitions spaced to prevent overwritten magnetic transitions of one said repeating pattern by another;

wherein said at least three spaced apart simultaneously written magnetic transitions, written to fix said distance between magnetic transitions having different azimuthal orientation and to fix said distance between magnetic transitions having parallel azimuthal orientation, are accompanied by additional separately written second spaced apart magnetic transitions fewer in number than said at least three simultaneously written magnetic transitions, written to provide different numbers of said magnetic transitions within said pattern, thereby providing synchronization of said repeating cyclic periodic sequence of magnetic transitions.

* * * * *